(12) United States Patent
Inoue et al.

(10) Patent No.: US 12,179,288 B2
(45) Date of Patent: Dec. 31, 2024

(54) LASER PROCESSING SYSTEM AND LASER PROCESSING METHOD BASED ON DIRECTION OF REINFORCED FIBER

(71) Applicant: MITSUBISHI HEAVY INDUSTRIES, LTD., Tokyo (JP)

(72) Inventors: Akiko Inoue, Tokyo (JP); Saneyuki Goya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 777 days.

(21) Appl. No.: 17/437,466

(22) PCT Filed: Mar. 27, 2019

(86) PCT No.: PCT/JP2019/013378
§ 371 (c)(1),
(2) Date: Sep. 9, 2021

(87) PCT Pub. No.: WO2020/194603
PCT Pub. Date: Oct. 1, 2020

(65) Prior Publication Data
US 2022/0184745 A1    Jun. 16, 2022

(51) Int. Cl.
| | |
|---|---|
| B23K 26/38 | (2014.01) |
| B23K 26/06 | (2014.01) |
| B23K 26/082 | (2014.01) |
| B23K 26/402 | (2014.01) |
| B23K 103/00 | (2006.01) |

(52) U.S. Cl.
CPC .......... *B23K 26/38* (2013.01); *B23K 26/0626* (2013.01); *B23K 26/082* (2015.10); *B23K 26/402* (2013.01); *B23K 2103/38* (2018.08); *B23K 2103/42* (2018.08)

(58) Field of Classification Search
CPC .. B23K 26/0626; B23K 26/082; B23K 26/38; B23K 26/402; B23K 2103/38; B23K 2103/42; B23K 2103/172; B23K 26/0652; B23K 26/032; B23K 26/0884; B29C 59/16; B29C 70/12
See application file for complete search history.

(56) References Cited

FOREIGN PATENT DOCUMENTS

JP    2016107574 A    6/2016

*Primary Examiner* — John P. Dulka
(74) *Attorney, Agent, or Firm* — HAUPTMAN HAM, LLP (57) ABSTRACT

A laser processing system and a laser processing method that reduce irregularities on a cutting surface caused by a variation in a heat affected zone or a difference in the heat affected zone due to processing by a laser beam. The laser processing system is provided with: a laser processing device that scans a composite material containing reinforced fibers and a resin with a laser beam to process the composite material; and a control device that controls the laser processing device. The control device calculates a scanning angle formed by a fiber direction that is a direction of the reinforced fibers and a scanning direction that is a direction in which the laser beam is caused to scan, calculates a scanning condition of the laser beam on the basis of the calculated scanning angle, and controls scanning of the laser beam on the basis of the calculated scanning condition.

9 Claims, 8 Drawing Sheets

| NUMBER OF TIMES OF SCANNING | SCANNING LAYER | SCANNING ANGLE | SCANNING SPEED | PROCESSING DEPTH |
|---|---|---|---|---|
| 1 | FIRST LAYER | 90 DEGREES | V3 | T1/3 |
| 2 | FIRST LAYER | 90 DEGREES | V3 | T1/3 |
| 3 | FIRST LAYER | 90 DEGREES | V3 | T1/3 |
| 4 | SECOND LAYER | 45 DEGREES | V2 | T2/2 |
| 5 | SECOND LAYER | 45 DEGREES | V2 | T2/2 |
| 6 | THIRD LAYER | 0 DEGREE | V1 | T3 |

FIG. 10

| NUMBER OF TIMES OF SCANNING | SCANNING LAYER | SCANNING ANGLE | POWER | PROCESSING DEPTH |
|---|---|---|---|---|
| 1 | FIRST LAYER | 90 DEGREES | P3 | T1/3 |
| 2 | FIRST LAYER | 90 DEGREES | P3 | T1/3 |
| 3 | FIRST LAYER | 90 DEGREES | P3 | T1/3 |
| 4 | SECOND LAYER | 45 DEGREES | P2 | T2/2 |
| 5 | SECOND LAYER | 45 DEGREES | P2 | T2/2 |
| 6 | THIRD LAYER | 0 DEGREE | P1 | T3 |

LASER PROCESSING SYSTEM AND LASER PROCESSING METHOD BASED ON DIRECTION OF REINFORCED FIBER

RELATED APPLICATIONS

The present application is a National Phase of International Application Number PCT/JP2019/013378 filed Mar. 27, 2019.

TECHNICAL FIELD

The present invention relates to a laser processing system and a laser processing method for a composite material containing a reinforced fiber and a resin.

BACKGROUND ART

As a method of cutting a composite material containing a reinforced fiber and a resin, a method of scanning the composite material with a laser beam along a cut surface is known (refer to PTL 1).

CITATION LIST

Patent Literature

[PTL 1] Japanese Unexamined Patent Application Publication No. 2016-107574

SUMMARY OF INVENTION

Technical Problem

In the method described in PTL 1, a heat affected region having a length which is approximately a tenth of a processing width by the laser beam is generated starting from the cut surface caused by the laser beam. In the method described in PTL 1, since variations in the shape and properties of the heat affected region are generated, variations in finishing with respect to the heat affected region are generated, causing a problem that extra time and costs for finishing are generated or quality variations caused by the shape of the heat affected region and finishing are generated.

The present invention is devised in view of the description above, and an object thereof is to provide a laser processing system and a laser processing method in which unevenness in a cut surface that occurs due to variations in a heat affected region or a difference in the heat affected region caused by processing with a laser beam is reduced.

Solution to Problem

In order to solve the problems described above and achieve the object, there is provided a laser processing system including a laser processing device that scans a composite material containing a reinforced fiber and a resin with a laser beam to process the composite material and a control device that controls the laser processing device. The control device calculates a scanning angle that is an angle formed by a fiber direction, which is a direction of the reinforced fiber, and a scanning direction, which is a direction in which scanning is performed with the laser beam, calculates a scanning condition of the laser beam based on the calculated scanning angle, and controls scanning with the laser beam based on the calculated scanning condition.

With the configuration, since the scanning condition can be calculated based on the scanning angle, which is a factor having an effect on the shape and properties of a heat affected region, and scanning with the laser beam is controlled based on the calculated scanning condition, unevenness in a cut surface, which occurs due to variations in the heat affected region generated or a difference in the heat affected region caused by processing with the laser beam, can be reduced.

In the configuration, it is preferable that the control device calculates the scanning condition for each region of the composite material, in which the scanning angle is constant, and controls scanning with the laser beam. In addition, it is more preferable that the region of the composite material, in which the scanning angle is constant, depends on a layer of the composite material, in which the fiber direction is constant. With the configurations, unevenness in the cut surface, which occurs due to variations in the heat affected region or a difference in the heat affected region caused by processing with the laser beam, can be preferably reduced particularly for the composite material which is obtained by combining a plurality of types of regions, in which fiber directions are constant, and the composite material which is obtained by stacking a plurality of types of layers, in which fiber directions are constant.

Alternatively, in the configuration, it is preferable that the control device calculates a continuous change in the scanning condition in accordance with a continuous change in the scanning angle and continuously controls scanning with the laser beam. In addition, it is more preferable that the continuous change in the scanning angle depends on scanning with the laser beam having a curved shape continuously changing the scanning direction. With the configurations, unevenness in the cut surface, which occurs due to variations in the heat affected region or a difference in the heat affected region caused by processing with the laser beam, can be preferably reduced particularly in a case of processing the composite material into a curve or a curved surface.

In the configurations, it is preferable that the control device calculates a scanning speed that is a speed, at which scanning is performed with the laser beam, as the scanning condition, and controls the scanning speed of the laser beam. Alternatively, in the configurations, it is preferable that the control device calculates power of the laser beam during scanning as the scanning condition, and controls the power of the laser beam during scanning. Alternatively, in the configurations, it is preferable that the control device calculates a combination of a scanning speed that is a speed, at which scanning is performed with the laser beam, and power of the laser beam during scanning as the scanning condition, and simultaneously controls the scanning speed of the laser beam and the power of the laser beam during scanning. With the configuration, unevenness in the cut surface, which occurs due to variations in the heat affected region generated or a difference in the heat affected region caused by processing with the laser beam, can be more preferably reduced by controlling the scanning speed of the laser beam and the power of the laser beam during scanning based on the scanning angle.

In order to solve the problems described above and achieve the object, there is provided a laser processing method including a scanning angle calculation step of calculating a scanning angle formed by a fiber direction, which is a direction of a reinforced fiber contained in a composite material, and a scanning direction, in which the composite material is scanned with a laser beam, a scanning condition calculation step of calculating a scanning condition of the laser beam based on the scanning angle calculated in the scanning angle calculation step, and a laser processing step of processing the composite material by controlling scanning with the laser beam based on the scanning condition calculated in the scanning condition calculation step. With the configuration, as in the laser processing system according to the present invention, since the scanning condition can be calculated based on the scanning angle, which is a factor having an effect on the shape and properties of the heat affected region, and scanning with the laser beam is controlled based on the calculated scanning condition, unevenness in the cut surface, which occurs due to variations in the heat affected region generated or a difference in the heat affected region caused by processing with the laser beam, can be reduced.

Advantageous Effects of Invention

With the present invention, it is possible to provide the laser processing system and the laser processing method, in which unevenness in the cut surface that occurs due to variations in the heat affected region or a difference in the heat affected region caused by processing with the laser beam is reduced.

DESCRIPTION OF EMBODIMENTS

Hereinafter, embodiments according to the present invention will be described in detail based on the drawings. The invention is not limited to the embodiments. In addition, components in the embodiments include components that can be easily replaced by those skilled in the art or components that are substantially the same. Further, components described below can be combined as appropriate.

First Embodiment

Figure 1:
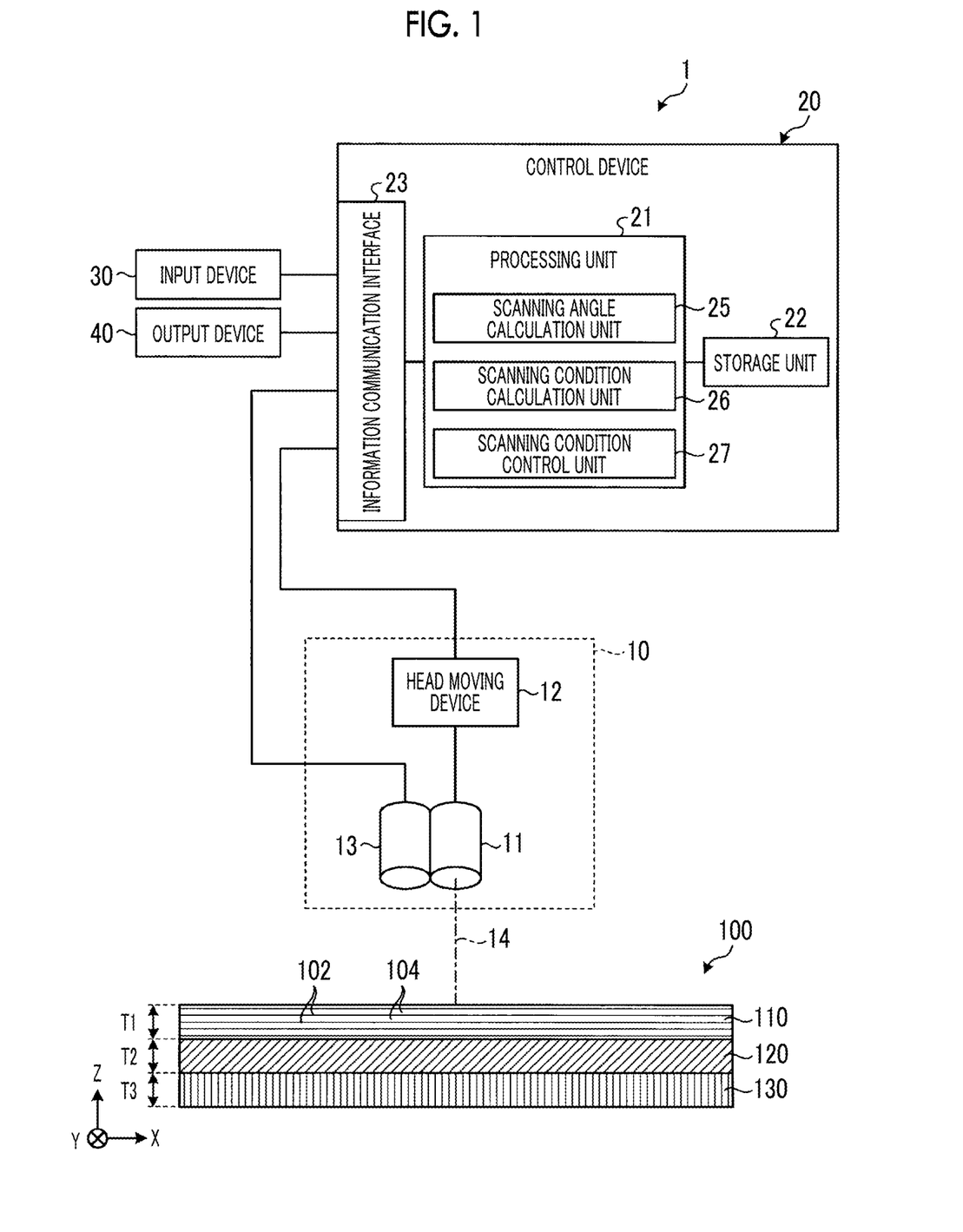
FIG. 1 is a configuration diagram of a laser processing system according to a first embodiment.

FIG. 1 is a configuration diagram of a laser processing system 1 according to a first embodiment. As shown in FIG. 1, the laser processing system 1 includes a laser processing device 10 and a control device 20. The laser processing system 1 is a system, in which the control device 20 performs predetermined control to be described later while the laser processing device 10 that performs laser processing on a composite material 100 by scanning the composite material 100 containing a reinforced fiber 102 and a resin 104 with a laser beam 14 for cutting. Herein, scanning the composite material 100 with the laser beam 14 means moving a processing position where the composite material 100 is processed with the laser beam 14 by moving an irradiation position where the composite material 100 is irradiated with the laser beam 14 in a state where the composite material 100 is irradiated with the laser beam 14.

As shown in FIG. 1, the composite material 100, which is a processing target of the laser processing system 1 in the first embodiment, has a first layer 110, a second layer 120, and a third layer 130, in order from an irradiation side (+Z direction side) where the laser beam 14 irradiation is performed. All of the first layer 110, the second layer 120, and the third layer 130 are layers made of a composite material along a plane direction (XY-plane direction) orthogonal to a laser beam 14 irradiation direction (Z-axis direction), and contain the reinforced fiber 102 and the resin 104. The first layer 110 has a thickness T1 in the laser beam 14 irradiation direction, the second layer 120 has a thickness T2 in the laser beam 14 irradiation direction, and the third layer 130 has a thickness T3 in the laser beam 14 irradiation direction.

Examples of the reinforced fiber 102 contained in the composite material 100, that is, the reinforced fiber 102 contained in the first layer 110, the second layer 120, and the third layer 130, include a carbon fiber, a metal fiber, a glass fiber, and a plastic fiber obtained by bundling approximately 100 to 10,000 basic fibers within a range of 1 μm or larger and 100 μm or smaller, preferably 3 μm or larger and 20 μm or smaller, and more preferably 5 μm or larger and 7 μm or smaller.

Examples of the resin 104 contained in the composite material 100, that is, the resin 104 contained in the first layer 110, the second layer 120, and the third layer 130 include a thermosetting resin that undergoes a thermosetting reaction from a softened state or a semi-cured state to a cured state through heating and a thermoplastic resin that undergoes a thermal melting reaction through heating.

In a case where the resin 104 is a thermosetting resin, a resin having an epoxy resin is given as an example. In a case where the resin 104 is a thermosetting resin, a polyester resin and a vinyl ester resin are given as other examples. In a case where the resin 104 is a thermoplastic resin, examples thereof include a polyamide resin, a polypropylene resin, an acrylonitrile butadiene styrene (ABS) resin, polyetheretherketone (PEEK), polyetherketoneketone (PEKK), and polyphenylene sulfide (PPS). However, the resin 104 is not limited thereto, and may be other resins.

The composite material 100, that is, the first layer 110, the second layer 120, and the third layer 130 configuring the composite material 100 may be a material obtained by causing the resin 104 to infiltrate into the reinforced fiber 102, or may be a commingled material, which is a blend of the reinforced fiber 102 and a resin fiber made of the resin 104. The commingled material also includes a commingled knit material obtained by weaving the reinforced fiber 102 and the resin fiber made of the resin 104 into a knit shape.

The composite material 100, which is a processing target of the laser processing system 1, that is, the first layer 110, the second layer 120, and the third layer 130 configuring the composite material 100 may be a prepreg of composite materials, or may be a composite material obtained by causing the resin 104 to be in a completely cured state. The composite material 100 obtained by causing the resin 104 to be in a completely cured state has light weight and high strength.

In the first embodiment, as shown in FIG. 1, a form, in which the composite material 100, which is a processing target of the laser processing system 1, is placed along an XY-plane, which is a horizontal plane, such that the first layer 110, the second layer 120, and the third layer 130 are arranged in this order when viewed from the +Z direction side, which is an upper side in a vertical direction, and the composite material 100 that is on a −Z direction side, which is a lower side in the vertical direction, is irradiated with the laser beam 14 for cutting from the +Z direction side, which is the upper side in the vertical direction, to perform laser processing on the composite material 100, will be described. The present invention is not limited to this form, and also includes a form in which laser processing is performed on the composite material 100 from any angle.

As shown in FIG. 1, the laser processing device 10 includes a laser irradiation head 11 that emits the laser beam 14 for cutting, a head moving device 12 that three-dimensionally moves the laser irradiation head 11, and an imaging device 13 that images an irradiation region including the irradiation position where the laser beam 14 irradiation is performed by the laser irradiation head 11.

The control device 20 controls the laser irradiation head 11 such that irradiation of the laser beam 14 for cutting is performed. The laser irradiation head 11 causes a laser light source for cutting (not shown) to emit the laser beam 14 for cutting, which has a frequency and power enabling to cut the composite material 100, from the +Z direction toward the −Z direction via a predetermined optical system (not shown). The laser irradiation head 11 causes the predetermined optical system to concentrate the laser beam 14 at a light concentration point in the vicinity of a surface of the composite material 100, adjusting a spot diameter of the laser beam 14 into, for example, approximately 10 μm or larger and 50 μm or smaller.

The head moving device 12 is a device that is attached to the laser irradiation head 11, receives control by the control device 20, and three-dimensionally moves the laser irradiation head 11. By moving the laser irradiation head 11 along an X-axis direction or a Y-axis direction, which is a horizontal direction, the head moving device 12 can move the irradiation position where the composite material 100 is irradiated with the laser beam 14 along the X-axis direction or the Y-axis direction, which is the horizontal direction. By moving the laser irradiation head 11 along the Z-axis direction, which is the vertical direction, the head moving device 12 can move a focal point of the laser beam 14 in the composite material 100 along the Z-axis direction. Suitable examples of the head moving device 12 include a drive system device such as a robot arm and a crane arm, an optical scanner such as a galvanometer mirror, and a polarizing element such as an electro-optical polarizing element.

The imaging device 13 is a device that is attached at a position adjacent to the laser irradiation head 11 in the horizontal direction (shown as a −X direction in FIG. 1) toward the lower side (−Z direction) in the vertical direction and images the irradiation region including the irradiation position where the laser beam 14 irradiation is performed by the laser irradiation head 11. The imaging device 13 is moved together with the laser irradiation head 11 by the head moving device 12. Suitable examples of the imaging device 13 include an optical camera and a laser camera, and in a case where the imaging device is such a device, the position, size, and shape of a heat affected region generated due to processing with the laser beam 14 can be detected by imaging the irradiation region of the composite material 100 from the upper side in the vertical direction (+Z direction side) and analyzing the captured image.

The laser processing system 1 may further include an input device 30 that receives an input of information related to laser processing of the composite material 100. The laser processing system 1 may further include an output device 40 that outputs the information related to laser processing of the composite material 100.

The input device 30 is an information processing terminal, and examples thereof include a mobile phone including a high-performance mobile phone (so-called smartphone), a tablet terminal, a notebook or desktop personal computer (PC), a personal digital assistant (PDA) which is a mobile information terminal, and a glasses-type or watch-type wearable device.

The input device 30 has a function for inputting various types of information necessary for the control device 20 to execute various types of computerized processing related to a laser processing method according to the embodiment, for example, a function of displaying an input screen for receiving the input of various types of information, which is transmitted from the control device 20, on a display unit of the input device 30 and a function of transmitting the various types of input information to the control device 20. The input device 30 realizes the various functions by executing software or applications for using the control device 20 or performing an Internet browser function for using the control device 20.

Based on the received information, the output device 40 displays characters, images, and moving images. The output device 40 has a function for outputting output information obtained as results of various types of computerized processing related to the laser processing method according to the embodiment, which is executed by the control device 20, for example, a function of receiving the output information which is output from the control device 20 and a function of causing a display unit of the output device 40 to display an output screen based on the output information. The output device 40 realizes the various functions by executing software or applications for using the control device 20 or performing an Internet browser function for using the control device 20.

Although the laser processing system 1 is separately provided with the input device 30 and the output device 40 in the present embodiment, the present invention is not limited thereto, and a form in which the input device 30 and the output device 40 are integrated may be adopted. In this case, for example, the display unit of the input device 30 functions as the output device 40.

The control device 20 is electrically connected to each device, that is, the laser irradiation head 11, the head moving device 12, and the imaging device 13, the input device 30, and the output device 40 of the laser processing device 10, and controls an operation of each of the devices.

The control device 20 is an information processing device including a computer system that controls the laser processing system 1. As shown in FIG. 1, the control device 20 has a processing unit 21, a storage unit 22, and an information communication interface 23.

The processing unit 21 is a controller, and various types of programs (corresponding to an example of a laser processing program) stored in the storage unit 22, which is a storage device inside the control device 20, are realized by being executed by, for example, a central processing unit (CPU) and a micro processing unit (MPU), in a random access memory (RAM), which is a work region. In addition, the processing unit 21 is, for example, a controller, and is realized by an integrated circuit, such as an application specific integrated circuit (ASIC) and a field programmable gate array (FPGA). The processing unit 21 is connected to the information communication interface 23 that receives an input of information from each device or outputs information, such as various types of parameters, measurement results, and calculation results related to the laser processing system 1, to the output device 40 electrically connected to the control device 20.

As shown in FIG. 1, the processing unit 21 is electrically connected to the storage unit 22 and the information communication interface 23 so as to be capable of transmitting and receiving information to and from each other, and functions as a control unit that controls each of the components. That is, the processing unit 21 functions as a control unit together with the storage unit 22, and causes the laser processing system 1 to perform the laser processing method according to the embodiment of the present invention.

As shown in FIG. 1, the processing unit 21 has a scanning angle calculation unit 25, a scanning condition calculation unit 26, and a scanning condition control unit 27. Each unit of the processing unit 21, that is, all of the scanning angle calculation unit 25, the scanning condition calculation unit 26, and the scanning condition control unit 27 are functional units realized as the processing unit 21 executes the laser processing program. A specific function of each unit included in the processing unit 21 will be described together with detailed description of the laser processing method according to the embodiment.

The storage unit 22 is realized by, for example, a read only memory (ROM), a random access memory (RAM), a semiconductor memory element, such as a flash memory, or a storage device, such as a hard disk and an optical disk. The storage unit 22 stores various types of output processing information necessary for generating a control signal for controlling each device of the laser processing system 1 and various types of input processing information necessary for analyzing a received signal obtained from each device of the laser processing system 1. In addition, the storage unit 22 stores, at any time, various types of input information obtained by analyzing the received signal obtained from each device of the laser processing system 1.

The information communication interface 23 connects the processing unit 21 to each device electrically connected to the control device 20 so as to be capable of transmitting and receiving information to and from each other. The information communication interface 23 receives information related to laser processing by the laser processing device 10 on the composite material 100 from the laser processing device 10 to transmit the information to the processing unit 21. Specifically, the information communication interface 23 receives information, such as the frequency, power, and spot diameter of the laser beam 14 emitted by the laser irradiation head 11, from the laser irradiation head 11 to transmit the information to the processing unit 21. In addition, the information communication interface 23 receives information of the three-dimensional position of the laser irradiation head 11, which is acquired by the head moving device 12, from the head moving device 12 to transmit the information to the processing unit 21. In addition, the information communication interface 23 receives information of the position, size, and shape of the heat affected region generated due to processing with the laser beam 14, which is acquired by the imaging device 13, from the imaging device 13 to transmit the information to the processing unit 21. In addition, the information communication interface 23 receives, from the input device 30, various types of information input from the input device 30 to transmit the information to the processing unit 21.

The information communication interface 23 receives each type of information generated by the processing unit 21, for example, a control signal for controlling each device from the processing unit 21, and transmits each type of information to each device. In addition, the information communication interface 23 receives output information obtained as results of various types of computerized processing related to the laser processing method according to the embodiment, which is generated by the processing unit 21, from the processing unit 21, and transmits the output information to the output device 40.

Figure 2:
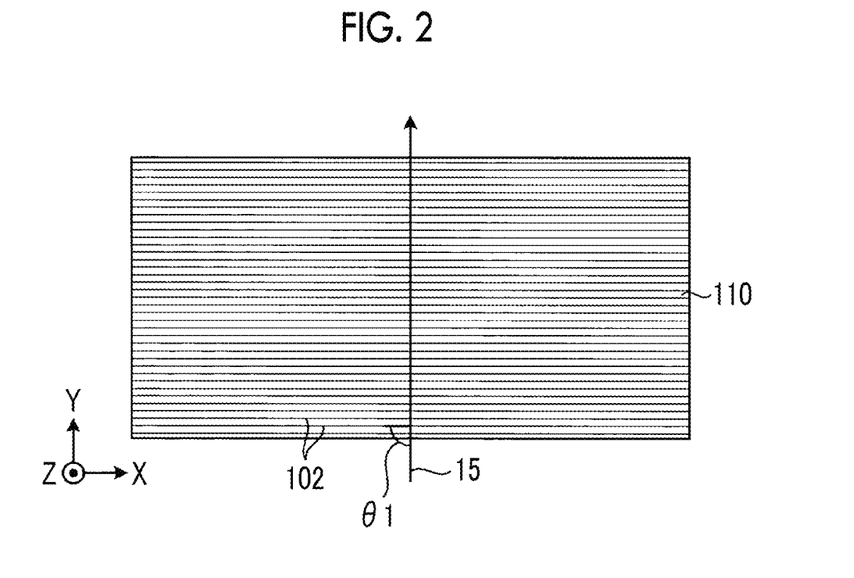
FIG. 2 is an explanatory diagram showing a first example of scanning with a laser beam according to the first embodiment.
Figure 3:
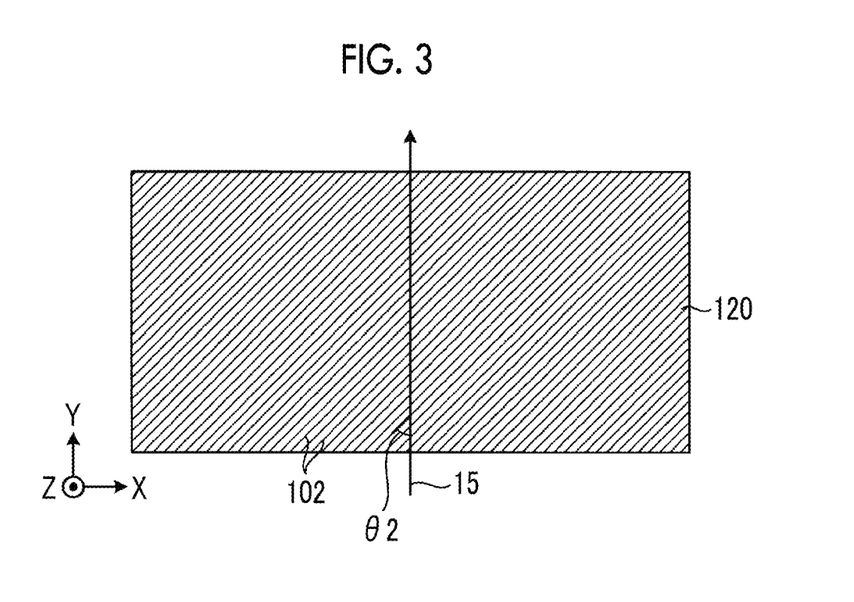
FIG. 3 is an explanatory diagram showing a second example of scanning with the laser beam according to the first embodiment.
Figure 4:
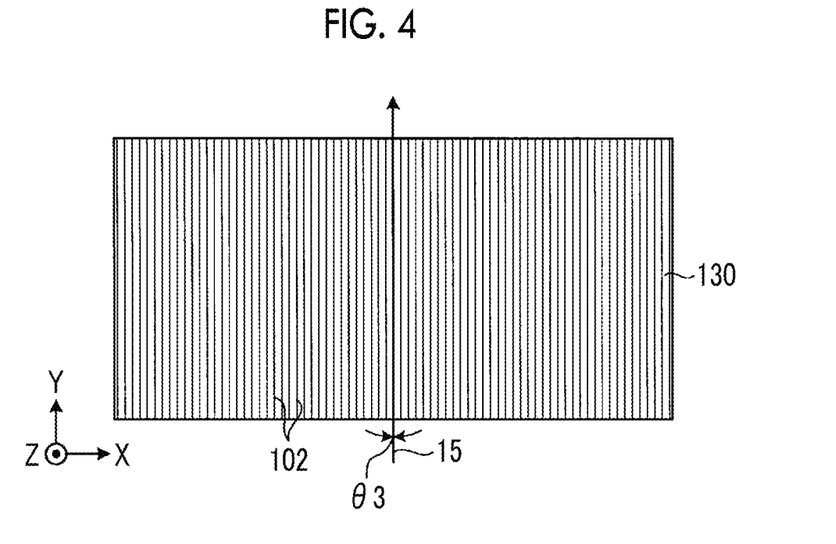
FIG. 4 is an explanatory diagram showing a third example of scanning with the laser beam according to the first embodiment.

FIG. 2 is an explanatory diagram showing a first example of scanning with the laser beam 14 according to the first embodiment. FIG. 3 is an explanatory diagram showing a second example of scanning with the laser beam 14 according to the first embodiment. FIG. 4 is an explanatory diagram showing a third example of scanning with the laser beam 14 according to the first embodiment. An example, in which scanning is performed with the laser beam 14 when the laser processing system 1 according to the first embodiment performs laser processing on the composite material 100, will be described below with reference to FIGS. 2 to 4.

As shown in FIG. 2, the first example of scanning with the laser beam 14 is an example of scanning the first layer 110 of the composite material 100 with the laser beam 14 along a scanning path 15. The reinforced fiber 102 contained in the first layer 110 is arranged generally along the X-axis direction, which is a longitudinal direction. That is, the first layer 110 is a unidirectional material in which a fiber direction, which is a direction of the reinforced fiber 102, is 0 degree with respect to the X-axis direction, which is the longitudinal direction. The first layer 110 may partially contain the reinforced fiber 102 that is not arranged along a direction of 0 degree with respect to the X-axis direction, which is the longitudinal direction.

The scanning path 15 is set from a −Y direction side toward a +Y direction side along the Y-axis direction that is a direction in the horizontal plane (XY-plane) orthogonal to the X-axis direction, which is the longitudinal direction. That is, a scanning direction that is a direction, in which scanning with the laser beam 14 is performed, is a +Y direction in the present embodiment. In the first embodiment, the scanning path 15 is set commonly to the first example, the second example, and the third example of scanning with the laser beam 14.

As shown in FIG. 2, in the first example of scanning with the laser beam 14, a scanning angle θ1 that is an angle formed by the fiber direction, which is a direction of the reinforced fiber 102 of the first layer 110, and the scanning direction, which is a direction in which scanning with the laser beam 14 is performed, is 90 degrees. The scanning angle θ is a parameter related to laser processing according to the present embodiment, which is a value of 0 degree or higher and 90 degrees or lower.

As shown in FIG. 3, the second example of scanning with the laser beam 14 is an example of scanning the second layer 120 of the composite material 100 with the laser beam 14 along the scanning path 15. The reinforced fiber 102 contained in the second layer 120 is arranged generally along a direction forming 45 degrees counterclockwise with respect to the X-axis direction, which is the longitudinal direction, when viewed from the upper side in the vertical direction. That is, the second layer 120 is a unidirectional material in which a fiber direction, which is a direction of the reinforced fiber 102, is 45 degrees with respect to the X-axis direction, which is the longitudinal direction. The second layer 120 may partially contain the reinforced fiber 102 that is not arranged along a direction of 45 degrees with respect to the X-axis direction, which is the longitudinal direction.

As shown in FIG. 3, in the second example of scanning with the laser beam 14, a scanning angle θ2 that is an angle formed by the fiber direction, which is the direction of the reinforced fiber 102 of the second layer 120, and the scanning direction, which is a direction in which scanning with the laser beam 14 is performed, is 45 degrees.

As shown in FIG. 4, the third example of scanning with the laser beam 14 is an example of scanning the third layer 130 of the composite material 100 with the laser beam 14 along the scanning path 15. The reinforced fiber 102 contained in the third layer 130 is arranged generally along the Y-axis direction that is orthogonal to the X-axis direction, which is the longitudinal direction. That is, the third layer 130 is a unidirectional material in which a fiber direction, which is a direction of the reinforced fiber 102, is 90 degrees with respect to the X-axis direction, which is the longitudinal direction. The third layer 130 may partially contain the reinforced fiber 102 that is not arranged along a direction of 90 degrees with respect to the X-axis direction, which is the longitudinal direction.

As shown in FIG. 4, in the third example of scanning with the laser beam 14, a scanning angle θ3 that is an angle formed by the fiber direction, which is the direction of the reinforced fiber 102 of the third layer 130, and the scanning direction, which is a direction in which scanning with the laser beam 14 is performed, is 0 degree.

As a result of thorough studies, the inventors have found out that the position, size, and shape of the heat affected region strongly depend on the scanning angle θ formed by the fiber direction of the composite material 100 and the laser beam 14 scanning direction. Specifically, the inventors have found out that the heat affected region in the composite material 100 is generated due to receiving of energy caused by the laser beam 14 and the resin 104 undergoing reactions, such as melting and volatilization, and the size and shape thereof are determined as the reinforced fiber 102 performs biased transmission of the energy caused by the laser beam 14 in the fiber direction.

Figure 5:
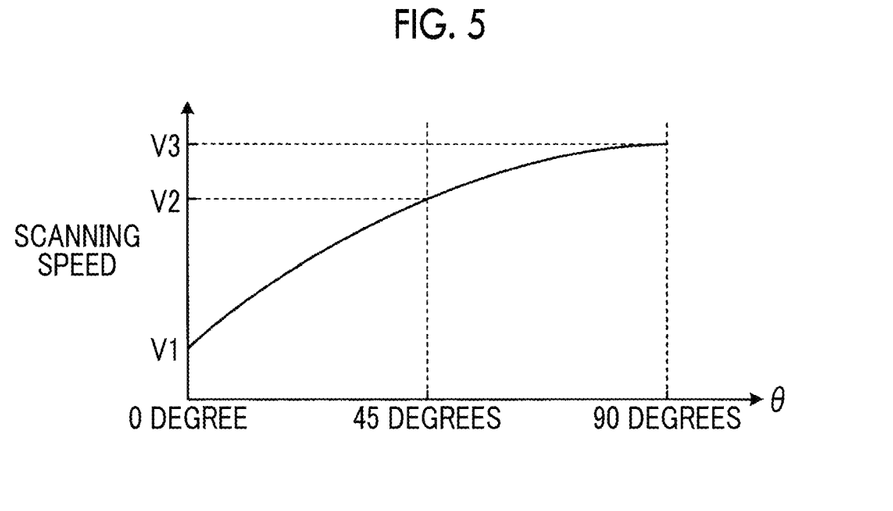
FIG. 5 is a graph showing an equal heat affected region line of a scanning speed of the laser beam according to the first embodiment.
Figure 6:
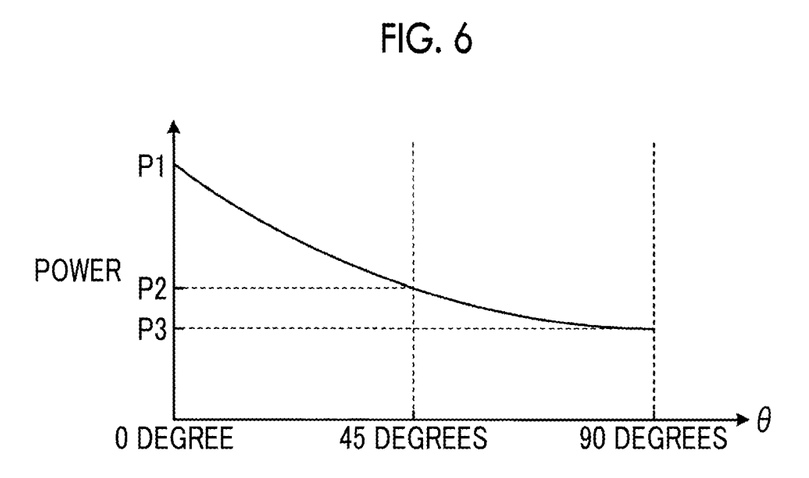
FIG. 6 is a graph showing an equal heat affected region line of power of the laser beam according to the first embodiment.

In view of the content that has been found out, the inventors have derived a tendency of an equal heat affected region line for making a distance from the scanning path 15 to the heat affected region uniform. FIG. 5 is a graph showing an equal heat affected region line of a scanning speed of the laser beam 14 according to the first embodiment. FIG. 6 is a graph showing an equal heat affected region line of power of the laser beam 14 according to the first embodiment. A tendency of the equal heat affected region line for making the distance from the scanning path 15 to the heat affected region uniform will be described below with reference to FIGS. 5 and 6.

The distance from the scanning path 15 to the heat affected region depends on a transmission speed of energy of the laser beam 14 in the composite material 100. The transmission speed of the energy of the laser beam 14 in the composite material 100 depends on a transmission speed of energy of the laser beam 14 in the reinforced fiber 102, a transmission speed of energy of the laser beam 14 in the resin 104, and the fiber direction. The transmission speed of the energy of the laser beam 14 in the composite material 100 is particularly influenced by the transmission speed of the energy of the laser beam 14 in the reinforced fiber 102 in the fiber direction, and this energy transmission speed in the reinforced fiber 102 in the fiber direction can be obtained through approximate calculation using a sine value (value calculated by a sin function) of the scanning angle θ.

Since the distance from the scanning path 15 to the heat affected region, the transmission speed of the energy of the laser beam 14 in the composite material 100, and the energy transmission speed in the reinforced fiber 102 in the fiber direction vary depending on the reinforced fiber 102 and the resin 104 specifically being used, it is preferable that these values are experimentally acquired in advance and are stored in the storage unit 22.

The equal heat affected region line of the scanning speed that is a speed, at which scanning is performed with the laser beam 14, is generally calculated in approximate proportion to the transmission speed of the energy of the laser beam 14, and can be obtained through approximate calculation with a function using the sine value of the scanning angle θ, as shown in FIG. 5. Specifically, the equal heat affected region line of the scanning speed of the laser beam 14 takes a scanning speed V1, which is a minimum value when the scanning angle θ is 0 degree, takes a scanning speed V3, which is a maximum value when the scanning angle θ is 90 degrees, and takes a scanning speed V2, which is a value between the scanning speed V1 and the scanning speed V3 when the scanning angle θ is 45 degrees and is close to the scanning speed V3.

The equal heat affected region line of the power of the laser beam 14 is generally calculated in approximate inverse proportion to the transmission speed of the energy of the laser beam 14, and can be obtained through approximate calculation with a function using the reciprocal of the sine value of the scanning angle θ, as shown in FIG. 6. Specifically, the equal heat affected region line of the power of the laser beam 14 takes power P1, which is a maximum value when the scanning angle θ is 0 degree, takes power P3, which is a minimum value when the scanning angle θ is 90 degrees, and takes power P2, which is a value between the power P1 and the power P3 when the scanning angle θ is 45 degrees and is close to the power P3.

The laser processing system 1 according to the first embodiment reduces unevenness in a cut surface, which occurs due to variations in the heat affected region generated or a difference in the heat affected region caused by processing with the laser beam 14, by performing laser processing on the composite material 100 under various scanning conditions of the laser beam 14 calculated based on the equal heat affected region line related to the laser beam 14.

Figure 7:
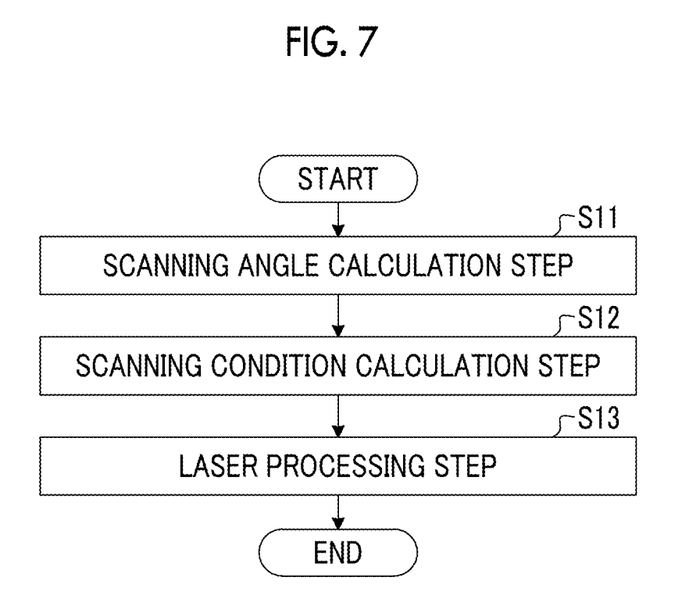
FIG. 7 is a flowchart showing a laser processing method according to the first embodiment.

The operation of the laser processing system 1 according to the first embodiment will be described below. FIG. 7 is a flowchart showing the laser processing method according to the first embodiment. The laser processing method performed by the laser processing system 1 will be described below together with a detailed function of each unit of the processing unit 21 of the control device 20 of the laser processing system 1.

As shown in FIG. 7, the laser processing method according to the first embodiment of the present invention has a scanning angle calculation step S11, a scanning condition calculation step S12, and a laser processing step S13.

The scanning angle calculation step S11 is a step in which the scanning angle calculation unit 25 calculates the scanning angle $\theta$ that is an angle formed by the fiber direction, which is the direction of the reinforced fiber 102 contained in the composite material 100, and the laser beam 14 scanning direction in which the composite material 100 is scanned.

Specifically, in the scanning angle calculation step S11, the scanning angle calculation unit 25 first acquires information related to the direction of the reinforced fiber 102 of the composite material 100, which is input from the input device 30 or is stored in the storage unit 22 of the control device 20 in advance. In the scanning angle calculation step S11, the scanning angle calculation unit 25 further acquires information related to the scanning path 15 for the laser beam 14, which is input from the input device 30 or is stored in the storage unit 22 of the control device 20 in advance.

In the scanning angle calculation step S11, next, the scanning angle calculation unit 25 calculates the scanning angle $\theta$ in the entire region of the composite material 100 on the scanning path 15, that is, the entire region of the composite material 100 on which laser processing is performed with the laser beam 14, based on the information related to the direction of the reinforced fiber 102 of the composite material 100 and the information related to the scanning path 15.

Figure 8:
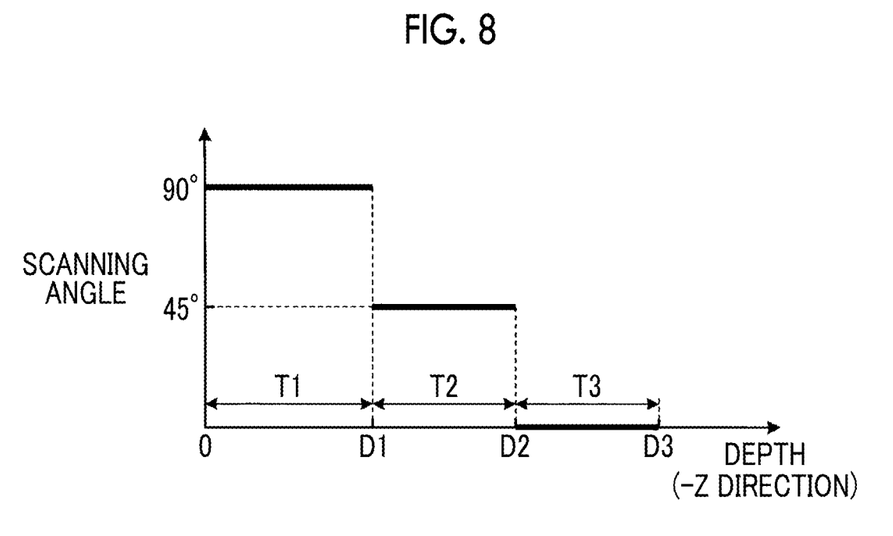
FIG. 8 is an explanatory diagram for describing a scanning angle calculation step according to the first embodiment.

FIG. 8 is an explanatory diagram for describing the scanning angle calculation step S11 according to the first embodiment. In the scanning angle calculation step S11, for example, in a case where the composite material 100, which is a target of laser processing, is a three-layer structure material configured by the first layer 110, which has the thickness T1 and is a 0-degree unidirectional material with respect to the longitudinal direction, the second layer 120, which has the thickness T2 and is a 45-degree unidirectional material with respect to the longitudinal direction, and the third layer 130, which has the thickness T3 and is a 90-degree unidirectional material with respect to the longitudinal direction as shown in FIG. 1, the scanning angle calculation unit 25 has calculated that the scanning angle $\theta1$ is 90 degrees since the first layer 110 is processed from a depth 0 to a depth D1 (D1=T1), the scanning angle $\theta2$ is 45 degrees since the second layer 120 is processed from the depth D1 to a depth D2 (D2=T1+T2), and the scanning angle $\theta3$ is 0 degree since the third layer 130 is processed from the depth D2 to a depth D3 (D3=T1+T2+T3), as shown in FIG. 8.

The scanning condition calculation step S12 is a step in which the scanning condition calculation unit 26 calculates the scanning conditions of the laser beam 14 based on the scanning angle $\theta$ calculated in the scanning angle calculation step S11.

In the first embodiment, in the scanning condition calculation step S12, it is preferable that the scanning condition calculation unit 26 calculates scanning conditions for each region of the composite material 100, in which the scanning angle $\theta$ is constant, that is, for each layer of the composite material 100, in which a fiber direction is constant.

Specifically, in the scanning condition calculation step S12, the scanning condition calculation unit 26 first acquires information related to items of scanning conditions that can be changed, which is input from the input device 30 or is stored in the storage unit 22 of the control device 20 in advance. In the scanning condition calculation step S12, the scanning condition calculation unit 26 determines a target to be calculated as a scanning condition based on the information related to items of scanning conditions that can be changed. In the scanning condition calculation step S12, the scanning condition calculation unit 26 determines at least any one of the scanning speed of the laser beam 14 and the power of the laser beam 14 during scanning as the target to be calculated as a scanning condition in the first embodiment.

In the scanning condition calculation step S12, in a case where the scanning speed of the laser beam 14 is determined as the target to be calculated as a scanning condition, the scanning condition calculation unit 26 calculates the scanning speed as a scanning condition of the laser beam 14 based on the scanning angle $\theta$ calculated in the scanning angle calculation step S11.

Figure 9:
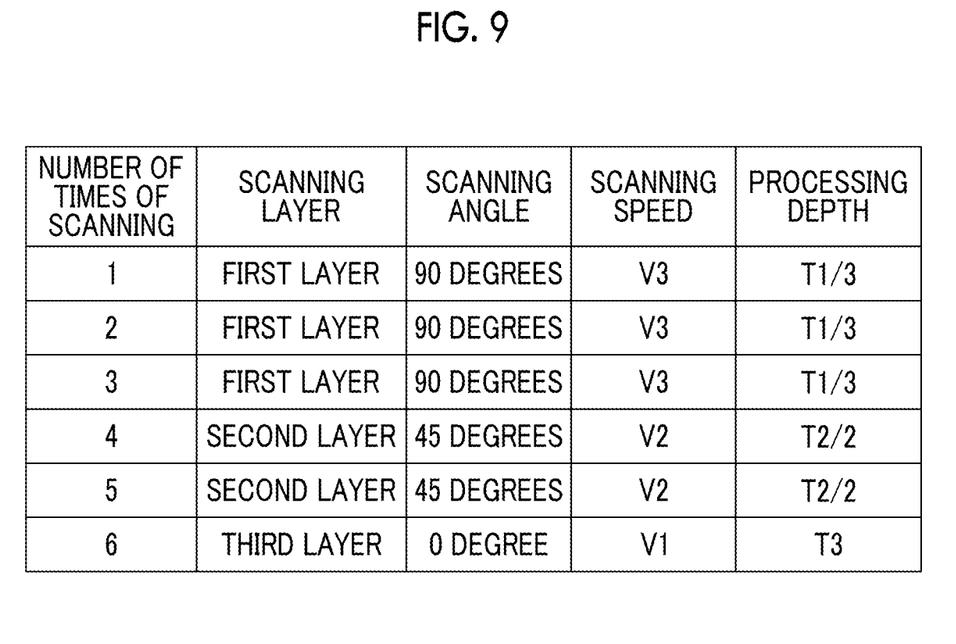
FIG. 9 is an explanatory diagram for describing a first example of a scanning condition calculation step according to the first embodiment.

FIG. 9 is an explanatory diagram for describing a first example of the scanning condition calculation step S12 according to the first embodiment. The first example of the scanning condition calculation step S12 is an example in a case where the scanning condition calculation unit 26 calculates the scanning speed as a scanning condition of the laser beam 14 based on the scanning angle $\theta$ calculated in the scanning angle calculation step S11.

In the first example of the scanning condition calculation step S12, the scanning condition calculation unit 26 calculates the scanning speed V3 of the laser beam 14 in a region where the first layer 110 is scanned as a scanning condition based on 90 degrees of the scanning angle $\theta1$ and information of the equal heat affected region line of the scanning speed of the laser beam 14 which is stored in the storage unit 22 in advance and is shown in FIG. 5, as shown in FIG. 9. In addition, in the first example of the scanning condition calculation step S12, the scanning condition calculation unit 26 calculates the scanning speed V2 of the laser beam 14 in a region where the second layer 120 is scanned as a scanning condition based on 45 degrees of the scanning angle $\theta2$ and the same information of the equal heat affected region line of the scanning speed of the laser beam 14. In addition, in the first example of the scanning condition calculation step S12, the scanning condition calculation unit 26 calculates the scanning speed V1 of the laser beam 14 in a region where the third layer 130 is scanned as a scanning condition based on 0 degree of the scanning angle $\theta3$ and the same information of the equal heat affected region line of the scanning speed of the laser beam 14.

In the first example of the scanning condition calculation step S12, the scanning condition calculation unit 26 calculates the number of times of scanning through the scanning path 15, which is necessary for realizing a desired processing depth, as one parameter of scanning conditions since with one time of scanning through the scanning path 15, the desired processing depth cannot be realized in some cases in a region where the scanning speed of the laser beam 14 is high. In the first example of the scanning condition calculation step S12, the scanning condition calculation unit 26 has calculated that the number of times of scanning through the scanning path 15, which is necessary for realizing a processing depth T1 of the first layer 110, is three times, the number of times of scanning through the scanning path 15, which is necessary for realizing a processing depth T2 of the second layer 120, is two times, and the number of times of scanning through the scanning path 15, which is necessary for realizing a processing depth T3 of the third layer 130, is one time. In this manner, in the first example of the scanning condition calculation step S12, the scanning condition calculation unit 26 has calculated scanning conditions shown in FIG. 9.

In the scanning condition calculation step S12, in a case where the power of the laser beam 14 during scanning is determined as the target to be calculated as a scanning condition, the scanning condition calculation unit 26 calculates the power during scanning as a scanning condition of the laser beam 14 based on the scanning angle θ calculated in the scanning angle calculation step S11.

Figure 10:
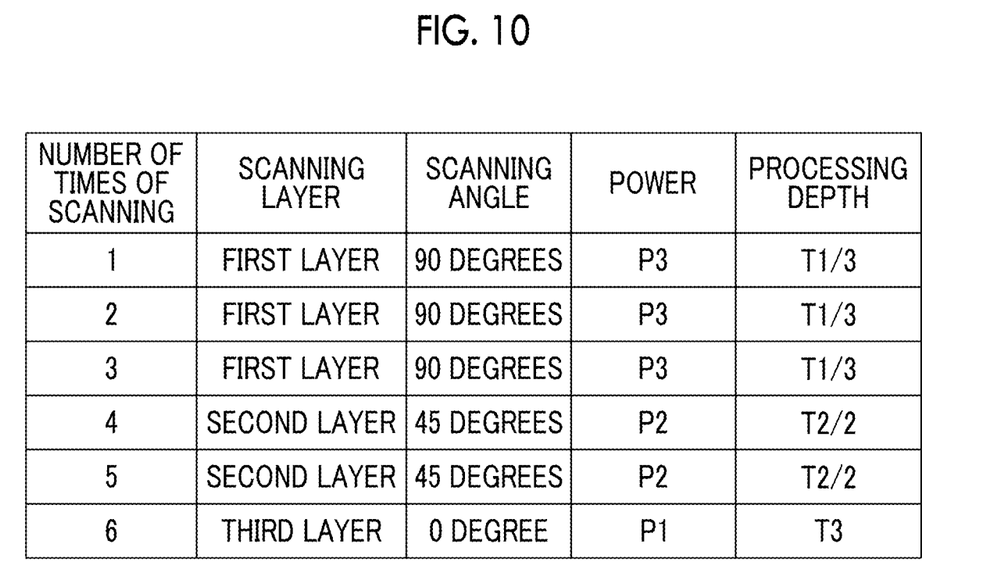
FIG. 10 is an explanatory diagram for describing a second example of the scanning condition calculation step according to the first embodiment.

FIG. 10 is an explanatory diagram for describing a second example of the scanning condition calculation step S12 according to the first embodiment. The second example of the scanning condition calculation step S12 is an example in a case where the scanning condition calculation unit 26 calculates the power during scanning as a scanning condition of the laser beam 14 based on the scanning angle θ calculated in the scanning angle calculation step S11.

In the second example of the scanning condition calculation step S12, the scanning condition calculation unit 26 calculates the power P3 of the laser beam 14 during scanning in the region where the first layer 110 is scanned as a scanning condition based on 90 degrees of the scanning angle θ1 and information of the equal heat affected region line of the power of the laser beam 14 during scanning which is stored in the storage unit 22 in advance and is shown in FIG. 6, as shown in FIG. 10. In addition, in the second example of the scanning condition calculation step S12, the scanning condition calculation unit 26 calculates the power P2 of the laser beam 14 during scanning in the region where the second layer 120 is scanned as a scanning condition based on 45 degrees of the scanning angle θ2 and the same information of the equal heat affected region line of the power of the laser beam 14 during scanning. In addition, in the second example of the scanning condition calculation step S12, the scanning condition calculation unit 26 calculates the power P1 of the laser beam 14 during scanning in the region where the third layer 130 is scanned as a scanning condition based on 0 degree of the scanning angle and the same information of the equal heat affected region line of the power of the laser beam 14 during scanning.

In the second example of the scanning condition calculation step S12, the scanning condition calculation unit 26 calculates the number of times of scanning through the scanning path 15, which is necessary for realizing a desired processing depth, as one parameter of scanning conditions since with one time of scanning through the scanning path 15, the desired processing depth cannot be realized in some cases in a region where the power of the laser beam 14 during scanning is low. In the second example of the scanning condition calculation step S12, the scanning condition calculation unit 26 has calculated that the number of times of scanning through the scanning path 15, which is necessary for realizing the processing depth T1 of the first layer 110, is three times, the number of times of scanning through the scanning path 15, which is necessary for realizing the processing depth T2 of the second layer 120, is two times, and the number of times of scanning through the scanning path 15, which is necessary for realizing the processing depth T3 of the third layer 130, is one time. In this manner, in the second example of the scanning condition calculation step S12, the scanning condition calculation unit 26 has calculated scanning conditions shown in FIG. 10.

In the scanning condition calculation step S12, the scanning condition calculation unit 26 may calculate a combination of the scanning speed of the laser beam 14 and the power of the laser beam 14 during scanning as a scanning condition.

The laser processing step S13 is a step in which the scanning condition control unit 27 controls scanning with the laser beam 14 by controlling the laser processing device based on the scanning condition calculated in the scanning condition calculation step S12 to process the composite material 100.

In the first embodiment, in the laser processing step S13, it is preferable that the scanning condition control unit 27 controls scanning with the laser beam 14 based on the scanning condition calculated in the scanning condition calculation step S12 for each region of the composite material 100, in which the scanning angle θ is constant, that is, for each layer of the composite material 100, in which a fiber direction is constant.

Specifically, in the laser processing step S13, the scanning condition control unit 27 moves the processing position where the composite material 100 is processed with the laser beam 14 by moving the laser irradiation head 11 via the control of the head moving device 12 and moving the irradiation position where the composite material 100 is irradiated with the laser beam 14 in a state where the composite material 100 is irradiated with the laser beam 14, thereby scanning the composite material 100 with the laser beam 14.

In the laser processing step S13, in a case where the scanning condition calculation unit 26 has calculated the scanning speed of the laser beam 14 as a scanning condition as shown in FIG. 9 in the scanning condition calculation step S12, the scanning condition control unit 27 controls the scanning speed of the laser beam 14 based on the scanning condition. In addition, in the laser processing step S13, in a case where the scanning condition calculation unit 26 has calculated the power of the laser beam 14 during scanning as a scanning condition as shown in FIG. 10 in the scanning condition calculation step S12, the scanning condition control unit 27 calculates the power of the laser beam 14 during scanning based on the scanning condition. In addition, in the laser processing step S13, in a case where the scanning condition calculation unit 26 has calculated a combination of the scanning speed of the laser beam 14 and the power of the laser beam 14 during scanning in the scanning condition calculation step S12, the scanning condition control unit 27 simultaneously controls the scanning speed of the laser beam 14 and the power of the laser beam 14 during scanning based on the scanning condition.

The laser processing method according to the first embodiment may further have a feedback step during or after performing the scanning angle calculation step S11, the scanning condition calculation step S12, and the laser processing step S13. The feedback step is a step in which the processing unit 21 of the control device 20 controls the imaging device 13 such that a state of the composite material 100 after being scanned with the laser beam 14 is imaged, detects the position, size, and shape of the heat affected region generated due to processing with the laser beam 14 by analyzing the captured image, and reviews the scanning conditions of the laser beam 14 based on the detected position, size, and shape of the heat affected region.

In the feedback step, in a case where the detected heat affected region is determined to be wider than a heat affected region assumed in advance, the processing unit 21 of the control device 20 corrects the information of the equal heat affected region line of the scanning speed of the laser beam 14 in a direction increasing the scanning speed, or corrects the information of the equal heat affected region line of the power of the laser beam 14 during scanning in a direction decreasing the power. In the feedback step, in a case where the detected heat affected region is determined to be narrower than the heat affected region assumed in advance, the processing unit 21 of the control device 20 corrects the information of the equal heat affected region line of the scanning speed of the laser beam 14 in a direction decreasing the scanning speed, or corrects the information of the equal heat affected region line of the power of the laser beam 14 during scanning in a direction increasing the power.

By adopting the feedback step, the laser processing method according to the first embodiment can preferably reduce unevenness in a cut surface, which occurs due to variations in the heat affected region or a difference in the heat affected region caused by processing with the laser beam 14, in a form following an actual laser processing system.

In the laser processing system 1 and the laser processing method according to the first embodiment, since the configurations above are adopted, scanning conditions can be calculated based on the scanning angle θ, which is a factor having an effect on the shape and properties of the heat affected region, and since scanning with the laser beam 14 is controlled based on the calculated scanning conditions, unevenness in a cut surface, which occurs due to variations in the heat affected region or a difference in the heat affected region caused by processing with the laser beam 14, can be reduced. For this reason, in the laser processing system 1 and the laser processing method according to the first embodiment, since variations in the shape and properties of the heat affected region are reduced, variations in finishing on the heat affected region can be reduced, and an operational effect, in which time and costs taken for finishing can be reduced or quality variations caused by the shape of the heat affected region and finishing can be reduced, is achieved.

In addition, in the laser processing system 1 and the laser processing method according to the first embodiment, the control device 20 calculates a scanning condition for each region of the composite material 100, in which the scanning angle θ is constant, and controls scanning with the laser beam 14. Further, in the laser processing system 1 and the laser processing method according to the first embodiment, the region of the composite material 100, in which the scanning angle θ is constant, depends on the layer of the composite material 100, in which a fiber direction is constant. For this reason, the laser processing system 1 and the laser processing method according to the first embodiment can preferably reduce unevenness in a cut surface, which occurs due to variations in the heat affected region or a difference in the heat affected region caused by processing with the laser beam 14, particularly for the composite material 100 that is obtained by combining a plurality of types of regions, in which fiber directions are constant, and the composite material 100 that is obtained by stacking a plurality of types of layers in which fiber directions are constant.

In addition, in the laser processing system 1 and the laser processing method according to the first embodiment, the control device 20 calculates the scanning speed that is a speed, at which scanning is performed with the laser beam 14, as a scanning condition, and controls the scanning speed of the laser beam 14. Alternatively, in the laser processing system 1 and the laser processing method according to the first embodiment, the control device 20 calculates the power of the laser beam 14 during scanning as a scanning condition, and controls the power of the laser beam 14 during scanning. Alternatively, in the laser processing system 1 and the laser processing method according to the first embodiment, the control device 20 calculates a combination of the scanning speed that is a speed, at which scanning is performed with the laser beam 14, and the power of the laser beam 14 during scanning, as a scanning condition, and simultaneously controls the scanning speed of the laser beam 14 and the power of the laser beam 14 during scanning. For this reason, the laser processing system 1 and the laser processing method according to the first embodiment can more preferably reduce unevenness in a cut surface, which occurs due to variations in the heat affected region or a difference in the heat affected region caused by processing with the laser beam 14, by controlling the scanning speed of the laser beam 14 and the power of the laser beam during scanning based on the scanning angle θ.

Second Embodiment

Figure 11:
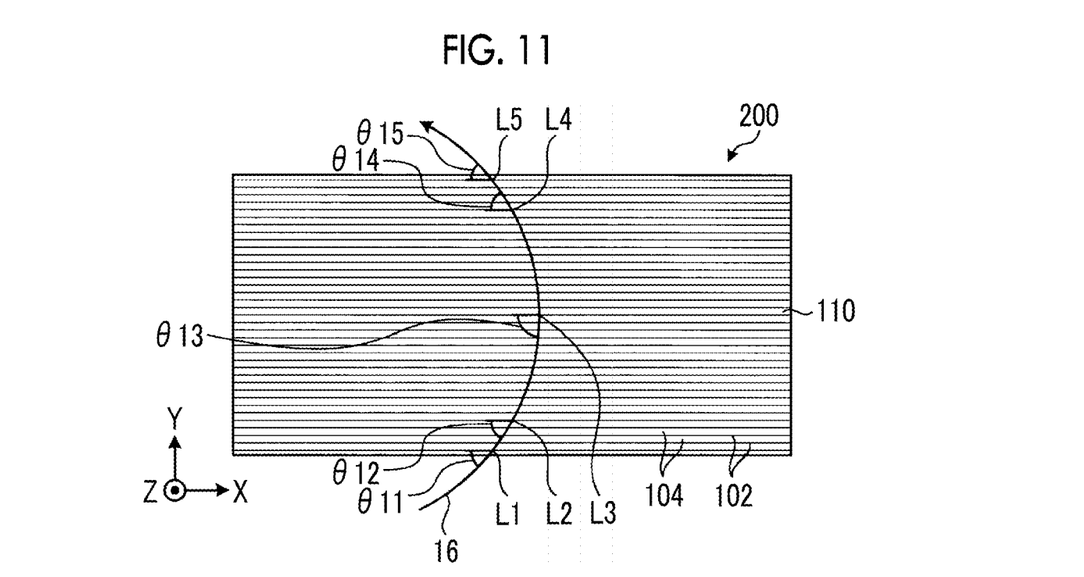
FIG. 11 is an explanatory diagram showing an example of scanning with a laser beam according to a second embodiment.

FIG. 11 is an explanatory diagram showing an example of scanning with the laser beam 14 according to a second embodiment. The laser processing system 1 according to the second embodiment is the same as the laser processing system 1 according to the first embodiment. A laser processing method according to the second embodiment is a method in which the composite material 100 in the laser processing method according to the first embodiment, which is a processing target of the laser processing system 1, is changed to a composite material 200, and the scanning path for scanning with the laser beam 14 in the laser processing method according to the first embodiment is changed to a scanning path 16. Other configurations in the laser processing method according to the second embodiment are the same as those in the laser processing method according to the first embodiment. In the description of the laser processing system 1 and the laser processing method according to the second embodiment, the same configurations as in the laser processing system 1 and the laser processing method according to the first embodiment will be assigned with the same group of reference signs as the first embodiment, and detailed description thereof will be omitted.

The composite material 200, which is a processing target of the laser processing system 1 according to the second embodiment, is configured only by the first layer 110 of the composite material 100, as shown in FIG. 11.

As shown in FIG. 11, the scanning path 16 is convex to a +X direction side to cross the composite material 200 from the −Y direction side toward the +Y direction side, and is set in a smooth curved shape in a mirror-symmetrical form with respect to a center line passing through the center of the Y-axis direction, which is parallel to the X-axis direction. Specifically, the scanning path 16 is set in a direction in which an angle θ11 is formed with respect to the X-axis direction, which is the longitudinal direction, at a passing point L1, which is an end portion on the −Y direction side, is set in a direction in which an angle θ12 is formed with respect to the X-axis direction, which is the longitudinal direction, at a passing point L2, which is a position advanced from the passing point L1 to the +Y direction side, is set in a direction in which an angle θ13 is formed with respect to the X-axis direction, which is the longitudinal direction, at a passing point L3 which corresponds to an intermediate point of the scanning path 16 and has further advanced from the passing point L2 to the +Y direction side, is set in a direction in which an angle θ14 is formed with respect to the X-axis direction, which is the longitudinal direction, at a passing point L4, which is a position further advanced from the passing point L3 to the +Y direction side, and is set in a direction in which an angle θ15 is formed with respect to the X-axis direction, which is the longitudinal direction, at a passing point L5, which is an end portion on the +Y direction side and has further advanced from the passing point L4 to the +Y direction side.

In the scanning path 16, the passing point L1 and the passing point L5 are in a mirror-symmetrical relationship with respect to the center line, and the angle θ11 and the angle θ15 are equal to each other. In addition, in the scanning path 16, the passing point L2 and the passing point L4 are in a mirror-symmetrical relationship with respect to the center line, the angle θ12 and the angle θ14 are equal to each other, and both are 45 degrees. In addition, in the scanning path 16, the passing point L3 is on the center line, and the angle θ13 is 90 degrees. In addition, in the scanning path 16, an angle formed with respect to the X-axis direction, which is the longitudinal direction, smoothly and monotonically increases between the passing point L1 and the passing point L3, and an angle formed with respect to the X-axis direction, which is the longitudinal direction, smoothly and monotonically decreases between the passing point L3 and the passing point L5.

In the example of scanning with the laser beam 14 according to the second embodiment, since the fiber direction, which is the direction of the reinforced fiber 102 of the first layer 110, matches the X-axis direction, which is the longitudinal direction, the angles θ11, θ12, θ13, θ14, and θ15 of the scanning path 16 with respect to the X-axis direction, which is the longitudinal direction, become the scanning angles θ11, θ12, θ13, θ14, and θ15 as they are. In the example of scanning with the laser beam 14 according to the second embodiment, a form in which the scanning angle θ continuously changes based on the smooth curved shape of the scanning path 16 as shown in FIG. 11 is adopted.

Figure 12:
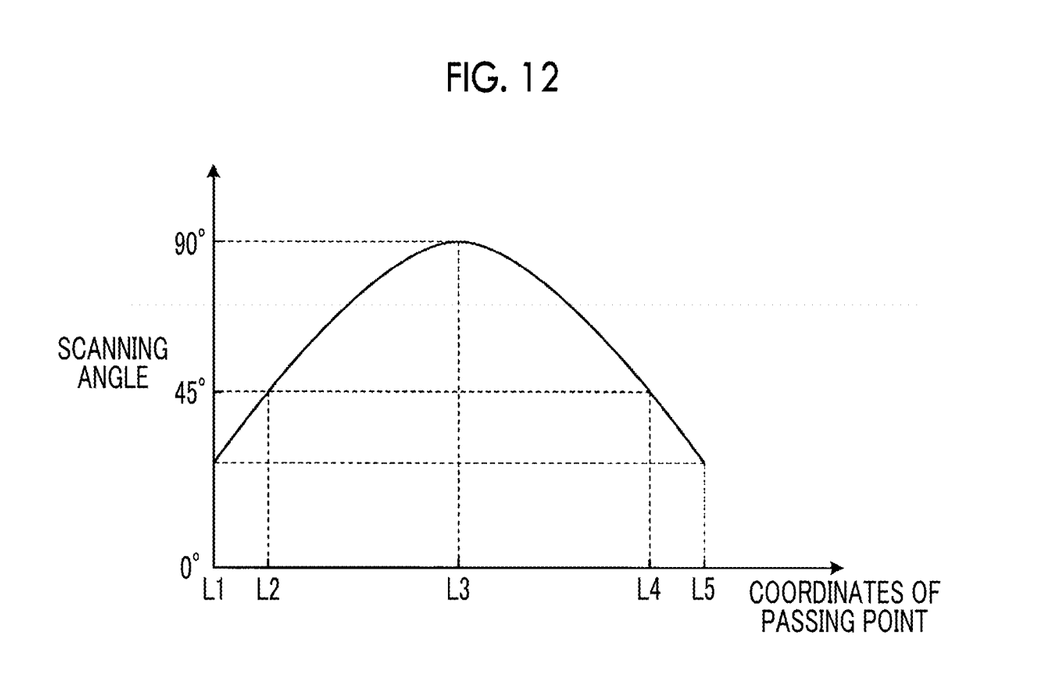
FIG. 12 is an explanatory diagram for describing a scanning angle calculation step according to the second embodiment.

FIG. 12 is an explanatory diagram for describing the scanning angle calculation step S11 according to the second embodiment. In the scanning angle calculation step S11 according to the second embodiment, the scanning angle calculation unit 25 has calculated that the angle is the scanning angle θ11 at the passing point L1, is the scanning angle θ12, that is, 45 degrees at the passing point L2, is the scanning angle θ13, that is, 90 degrees at the passing point L3, is the scanning angle θ14, that is, 45 degrees at the passing point L4, and is the scanning angle θ15 at the passing point L5, as shown in FIG. 12, for example, in a case of scanning the composite material 200 that is a target of laser processing and is formed by the first layer 110, which has the thickness T1 and is made of a 0-degree unidirectional material with respect to the longitudinal direction, with the laser beam 14 along the scanning path 16, as shown in FIG. 11. In the scanning angle calculation step S11 according to the second embodiment, more specifically, the scanning angle calculation unit 25 performs calculation for a graph of the scanning angles θ with respect to coordinates of the passing points on the scanning path 16, which is a mirror image with respect to the passing point L3 corresponding to the intermediate point of the scanning path 16 as shown in FIG. 12.

In the second embodiment, in the scanning condition calculation step S12, the scanning condition calculation unit 26 preferably calculates a continuous change in the scanning condition in accordance with a continuous change in the scanning angle θ, more specifically, in accordance with a continuous change in the scanning angle θ, which is caused by scanning with the laser beam 14 along the scanning path 16 having a curved shape continuously changing the scanning direction.

Figure 13:
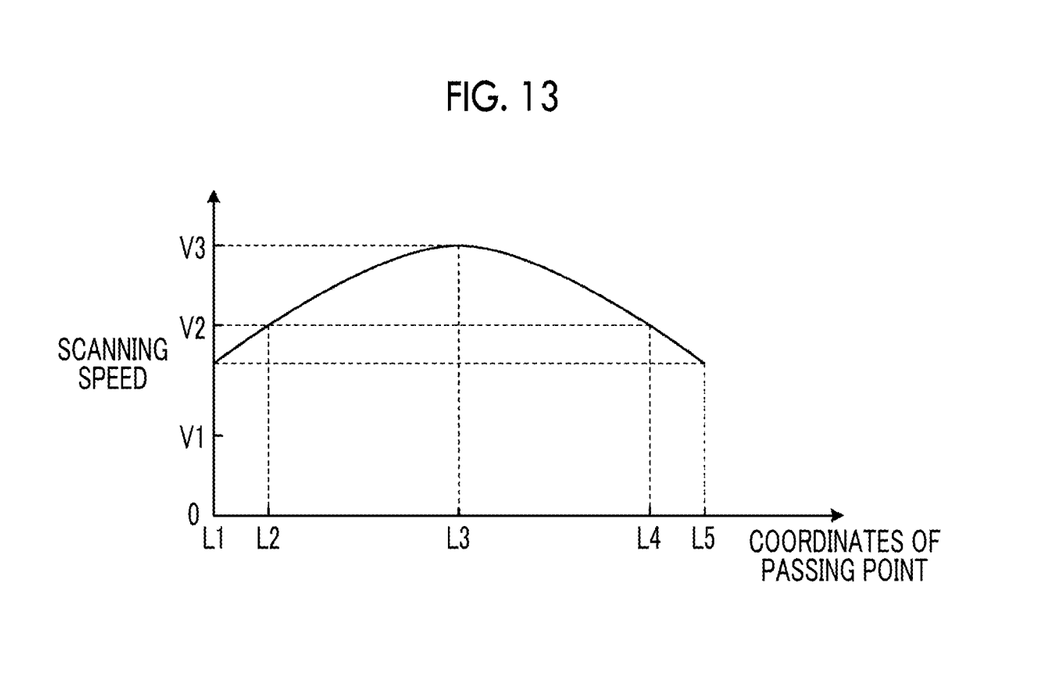
FIG. 13 is an explanatory diagram for describing a first example of a scanning condition calculation step according to the second embodiment.

FIG. 13 is an explanatory diagram for describing a first example of the scanning condition calculation step S12 according to the second embodiment. The first example of the scanning condition calculation step S12 according to the second embodiment is an example in a case where the scanning condition calculation unit 26 calculates the scanning speed as a scanning condition of the laser beam 14 based on the scanning angle θ calculated in the scanning angle calculation step S11 according to the second embodiment.

In the first example of the scanning condition calculation step S12 according to the second embodiment, the scanning condition calculation unit 26 has calculated, as shown in FIG. 13, the scanning speed lower than the scanning speed V2 as a scanning condition based on the scanning angle θ11, which is smaller than 45 degrees, at the passing point L1, and the information of the equal heat affected region line of the scanning speed of the laser beam 14, which is stored in the storage unit 22 in advance and is shown in FIG. 5. In the first example of the scanning condition calculation step S12 according to the second embodiment, as shown in FIG. 13, as in the passing point L1, the scanning condition calculation unit 26 has calculated the scanning speed V2 as a scanning condition at the passing point L2 based on 45 degrees of the scanning angle θ12 and the information of the equal heat affected region line of the scanning speed of FIG. 5, has calculated the scanning speed V3 as a scanning condition at the passing point L3 based on 90 degrees of the scanning angle θ13 and the information of the equal heat affected region line of the scanning speed of FIG. 5, has calculated the scanning speed V2 as a scanning condition at the passing point L4 based on 45 degrees of the scanning angle θ14 and the information of the equal heat affected region line of the scanning speed of FIG. 5, and has calculated the scanning speed smaller than the scanning speed V2 as a scanning condition at the passing point L5 based on the scanning angle θ15 smaller than 45 degrees and the information of the equal heat affected region line of the scanning speed of FIG. 5. In the first example of the scanning condition calculation step S12 according to the second embodiment, more specifically, the scanning condition calculation unit 26 performs calculation for a graph of the scanning speed that smoothly and continuously changes with respect to the coordinates of the passing points on the scanning path 16, which is a mirror image with respect to the passing point L3 corresponding to the intermediate point of the scanning path 16 as shown in FIG. 13.

Figure 14:
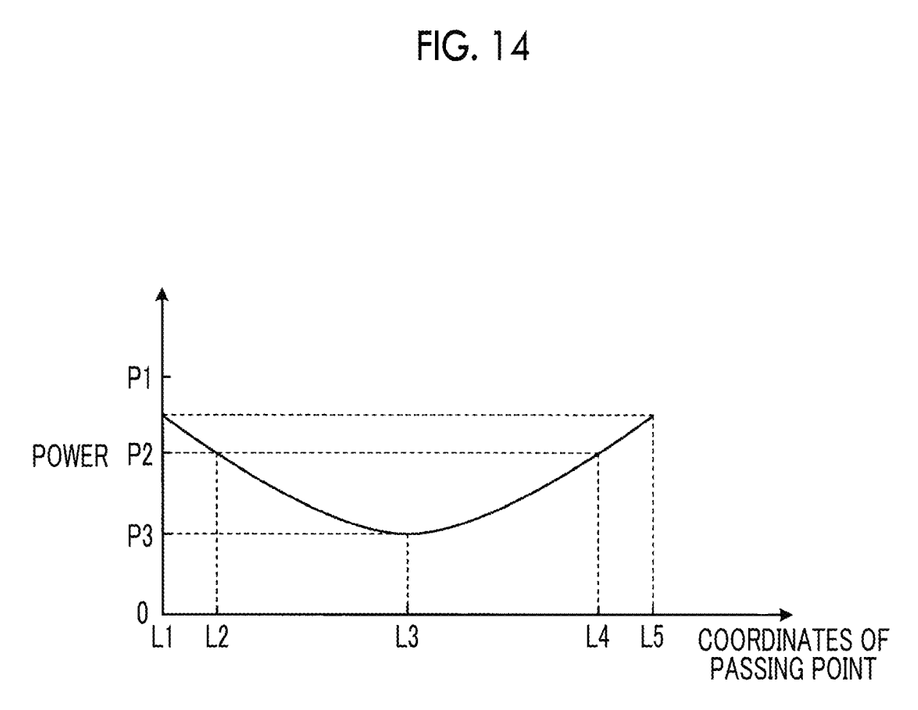
FIG. 14 is an explanatory diagram for describing a second example of the scanning condition calculation step according to the second embodiment.

FIG. 14 is an explanatory diagram for describing a second example of the scanning condition calculation step S12 according to the second embodiment. The second example of the scanning condition calculation step S12 according to the second embodiment is an example in a case where the scanning condition calculation unit 26 calculates the power during scanning as a scanning condition of the laser beam 14 based on the scanning angle θ calculated in the scanning angle calculation step S11 according to the second embodiment.

In the second example of the scanning condition calculation step S12 according to the second embodiment, the scanning condition calculation unit 26 has calculated, as shown in FIG. 14, power larger than the power P2 as a scanning condition based on the scanning angle θ11, which is smaller than 45 degrees, at the passing point L1, and the information of the equal heat affected region line of the power of the laser beam 14 during scanning, which is stored in the storage unit 22 in advance and is shown in FIG. 6. In the second example of the scanning condition calculation step S12 according to the second embodiment, as shown in FIG. 14, as in the passing point L1, the scanning condition calculation unit 26 has calculated the power P2 as a scanning condition at the passing point L2 based on 45 degrees of the scanning angle θ12 and the information of the equal heat affected region line of the power of FIG. 6, has calculated the power P3 as a scanning condition at the passing point L3 based on 90 degrees of the scanning angle θ13 and the information of the equal heat affected region line of the power of FIG. 6, has calculated the power P2 as a scanning condition at the passing point L4 based on 45 degrees of the scanning angle θ14 and the information of the equal heat affected region line of the power of FIG. 6, and has calculated power larger than the power P2 as a scanning condition at the passing point L5 based on the scanning angle θ15 smaller than 45 degrees and the information of the equal heat affected region line of the power of FIG. 6. In the second example of the scanning condition calculation step S12 according to the second embodiment, more specifically, the scanning condition calculation unit 26 performs calculation for a graph of the power that smoothly and continuously changes with respect to the coordinates of the passing points on the scanning path 16, which is a mirror image with respect to the passing point L3 corresponding to the intermediate point of the scanning path 16 as shown in FIG. 14.

In the second embodiment, in the laser processing step S13, the scanning condition control unit 27 preferably controls scanning with the laser beam 14 continuously based on the scanning condition calculated in the scanning condition calculation step S12, in accordance with a continuous change in the scanning angle θ, more specifically, in accordance with a continuous change in the scanning angle θ, which is caused by scanning with the laser beam 14 along the scanning path 16 having a curved shape continuously changing the scanning direction.

In the laser processing system 1 and the laser processing method according to the second embodiment, since the configurations above are adopted, as in the laser processing system 1 and the laser processing method according to the first embodiment, scanning conditions can be calculated based on the scanning angle θ, which is a factor having an effect on the shape and properties of the heat affected region, and since scanning with the laser beam 14 is controlled based on the calculated scanning conditions, unevenness in a cut surface, which occurs due to variations in the heat affected region or a difference in the heat affected region caused by processing with the laser beam 14, can be reduced. For this reason, in the laser processing system 1 and the laser processing method according to the second embodiment, as in the laser processing system 1 and the laser processing method according to the first embodiment, since variations in the shape and properties of the heat affected region are reduced, variations in finishing on the heat affected region can be reduced, and an operational effect, in which time and costs taken for finishing can be reduced or quality variations caused by the shape of the heat affected region and finishing can be reduced, is achieved. In addition, in the laser processing system 1 and the laser processing method according to the second embodiment, the same operational effect as the laser processing system 1 and the laser processing method according to the first embodiment is achieved, except for an operational effect that first occurs by performing laser processing on the composite material 100.

In addition, in the laser processing system 1 and the laser processing method according to the second embodiment, the control device 20 calculates a continuous change in a scanning condition in accordance with a continuous change in the scanning angle θ, and continuously controls scanning with the laser beam 14. Further, in the laser processing system 1 and the laser processing method according to the second embodiment, a continuous change in the scanning angle θ depends on scanning with the laser beam 14 having a curved shape continuously changing the scanning direction. For this reason, the laser processing system 1 and the laser processing method according to the second embodiment can preferably reduce unevenness in a cut surface, which occurs due to variations in the heat affected region or a difference in the heat affected region caused by processing with the laser beam 14, particularly in a case of processing the composite material 100 into a curve or a curved surface.

REFERENCE SIGNS LIST 1 laser processing system
10 laser processing device
11 laser irradiation head
12 head moving device
13 imaging device
14 laser beam
15, 16 scanning path
20 control device
21 processing unit
22 storage unit
23 information communication interface
25 scanning angle calculation unit
26 scanning condition calculation unit
27 scanning condition control unit
30 input device
40 output device
100, 200 composite material
102 reinforced fiber
104 resin
110 first layer
120 second layer
130 third layer
P1, P2, P3 power
V1, V2, V3 scanning speed
θ, θ1, θ2, θ3, θ11, θ12, θ13, θ14, θ15 scanning angle

The invention claimed is:

1. A laser processing system comprising:
a laser processing device that scans a composite material containing a reinforced fiber and a resin with a laser beam to process the composite material; and
a control device that controls the laser processing device, wherein the control device calculates a scanning angle that is an angle formed by a fiber direction, which is a direction of the reinforced fiber, and a scanning direction, which is a direction in which scanning is performed with the laser beam, calculates a scanning condition of the laser beam based on the calculated scanning angle, and controls scanning with the laser beam based on the calculated scanning condition.

2. The laser processing system according to claim 1, wherein the control device calculates the scanning condition for each region of the composite material, in which the scanning angle is constant, and controls scanning with the laser beam.

3. The laser processing system according to claim 2, wherein the region of the composite material, in which the scanning angle is constant, depends on a layer of the composite material, in which the fiber direction is constant.

4. The laser processing system according to claim 1, wherein the control device calculates a continuous change in the scanning condition in accordance with a continuous change in the scanning angle and continuously controls scanning with the laser beam.

5. The laser processing system according to claim 4, wherein the continuous change in the scanning angle depends on scanning with the laser beam having a curved shape continuously changing the scanning direction.

6. The laser processing system according to claim 1, wherein the control device calculates a scanning speed that is a speed, at which scanning is performed with the laser beam, as the scanning condition, and controls the scanning speed of the laser beam.

7. The laser processing system according to claim 1, wherein the control device calculates power of the laser beam during scanning as the scanning condition, and controls the power of the laser beam during scanning.

8. The laser processing system according to claim 1, wherein the control device calculates a combination of a scanning speed that is a speed, at which scanning is performed with the laser beam, and power of the laser beam during scanning as the scanning condition, and simultaneously controls the scanning speed of the laser beam and the power of the laser beam during scanning.

9. A laser processing method comprising:

a scanning angle calculation step of calculating a scanning angle formed by a fiber direction, which is a direction of a reinforced fiber contained in a composite material, and a scanning direction, in which the composite material is scanned with a laser beam;

a scanning condition calculation step of calculating a scanning condition of the laser beam based on the scanning angle calculated in the scanning angle calculation step; and a laser processing step of processing the composite material by controlling scanning with the laser beam based on the scanning condition calculated in the scanning condition calculation step.

* * * * *